(12) United States Patent
Abdel-Kader

(10) Patent No.: US 8,208,911 B2
(45) Date of Patent: Jun. 26, 2012

(54) SYSTEM AND METHOD FOR IDENTIFYING A CONTACT ASSOCIATED WITH AN ELECTRONIC COMMUNICATION

(75) Inventor: Sherif Aly Abdel-Kader, Waterloo (CA)

(73) Assignee: Research In Motion Limited, Waterloo (CA)

( * ) Notice: Subject to any disclaimer, the term of this patent is extended or adjusted under 35 U.S.C. 154(b) by 163 days.

(21) Appl. No.: 12/713,200

(22) Filed: Feb. 26, 2010

(65) Prior Publication Data

US 2011/0212712 A1 Sep. 1, 2011

(51) Int. Cl.
*H04M 3/42* (2006.01)
(52) U.S. Cl. ...................................................... 455/415
(58) Field of Classification Search .................... 455/415
See application file for complete search history.

(56) References Cited

U.S. PATENT DOCUMENTS

| | | | |
|---|---|---|---|
| 6,950,504 B1 * | 9/2005 | Marx et al. | 379/88.19 |
| 7,336,772 B1 * | 2/2008 | Velusamy | 379/88.17 |
| 2006/0052091 A1 * | 3/2006 | Onyon et al. | 455/415 |
| 2006/0291635 A1 * | 12/2006 | Sun et al. | 379/142.06 |

FOREIGN PATENT DOCUMENTS

WO 2004028123 4/2004

OTHER PUBLICATIONS

Extended European Search Report for European Application No. 10154891.5 (Aug. 25, 2010).

* cited by examiner

*Primary Examiner* — Nick Corsaro
*Assistant Examiner* — Joel Ajayi
(74) *Attorney, Agent, or Firm* — Ridout & Maybee LLP

(57) ABSTRACT

A method is provided on an electronic communications device having a subscriber identifier, the method for identifying a contact entry associated with an electronic communication specified by a communication identifier. The method comprises searching an address book associated with the device; in response to finding a first and a second contact entry each having a respective first contact communication identifier matching the communication identifier, comparing a second contact communication identifier with the subscriber identifier; and identifying the second contact entry associated with the electronic communication if the second contact communication identifier in the first contact entry matches the subscriber identifier.

20 Claims, 24 Drawing Sheets

US 8,208,911 B2

SYSTEM AND METHOD FOR IDENTIFYING A CONTACT ASSOCIATED WITH AN ELECTRONIC COMMUNICATION

TECHNICAL FIELD

The present disclosure relates generally to electronic communications, and more particularly to a system and method for identifying a contact associated with an electronic communication.

BACKGROUND

Electronic communications devices, hereinafter referred to as "communications devices", such as cellular phones, personal digital assistants, or laptop computers are increasingly becoming popular.

Conventionally, when an incoming electronic communication, hereinafter referred to as "incoming communication", such as phone call, or an e-mail message arrives at a communications device, it is often desirable to identify, to the subscriber of the device, the initiator of such incoming communication. Similarly, when an outgoing electronic communication, hereinafter referred to as "outgoing communication", is initiated at a communications device, it is often desirable to identify the recipient of the outgoing communication.

A situation can arise when two possibilities exist for an initiator or a recipient of a communication.

BRIEF DESCRIPTION OF THE DRAWINGS

Reference will now be made to the drawings, which show by way of example, implementations of the present disclosure, in which like reference numerals refer to like elements, and in which.

DETAILED DESCRIPTION

Figure 1:
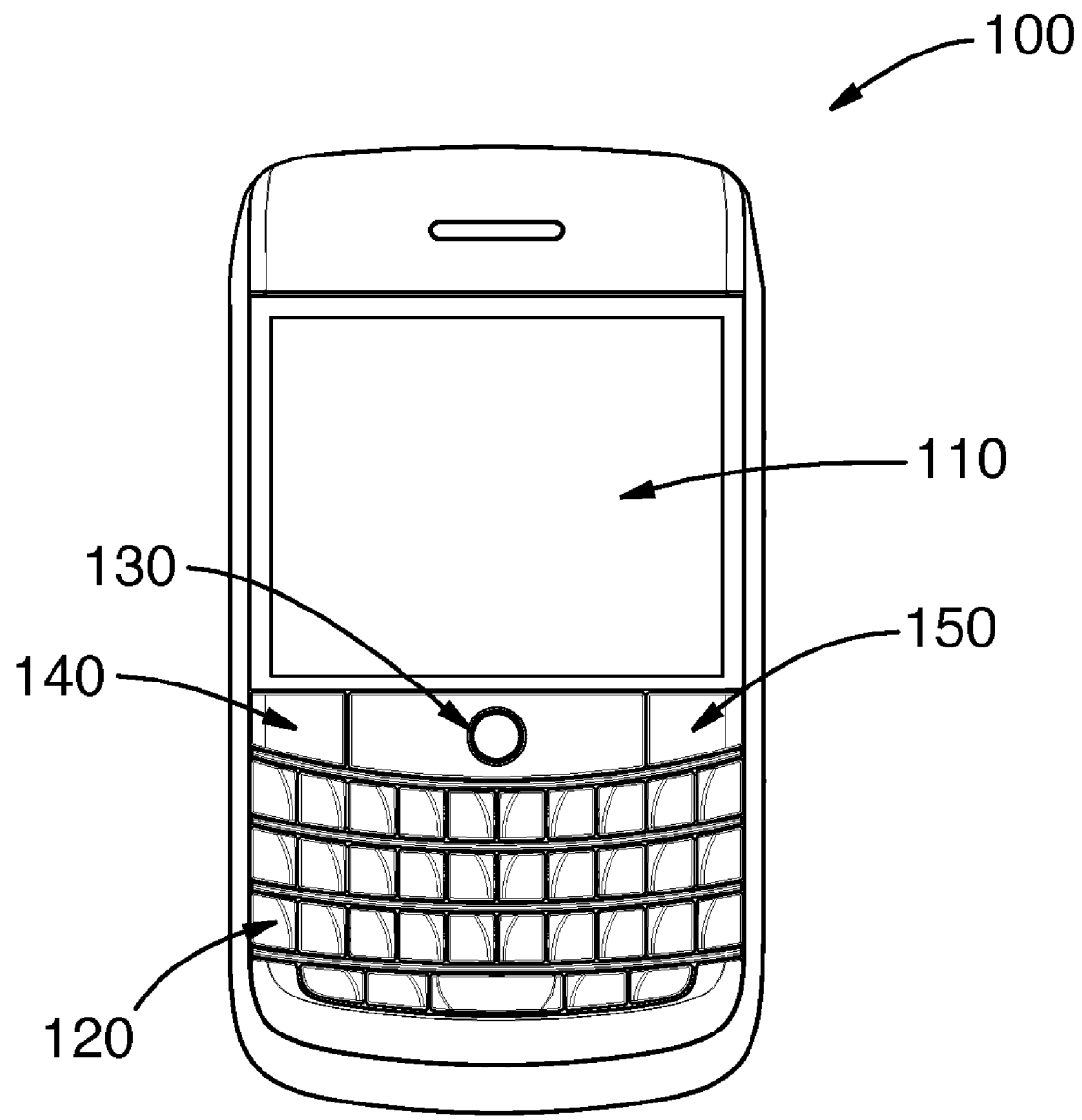
FIG. 1 is an illustration of an exemplary communications device.

In one aspect of the present disclosure there is provided a method for execution at a communications device, the method comprising: searching an address book for a first contact entry and a second contact entry, the address book having a plurality of contact entries, each contact entry storing a contact identity identifier and at least two contact communication identifiers, each of the first and second contact entries having a respective first contact communication identifier matching a predetermined communication identifier associated with an electronic communication; in response to finding the first and second contact entries, comparing a second contact communication identifier in each of the first and second contact entries with a subscriber identifier associated with the communications device; and identifying the second contact entry as the contact entry associated with the electronic communication in response to a match of the second contact communication identifier in the first contact entry to the subscriber identifier.

In another aspect of the present disclosure there is provided a computer program product comprising a non-transitory computer-readable medium storing computer-readable instructions which, when executed, direct a communications device to search an address book for a first contact entry and a second contact entry, the address book having a plurality of contact entries, each contact entry storing a contact identity identifier and at least two contact communication identifiers, each of the first and second contact entries having a respective first contact communication identifier matching a predetermined communication identifier associated with an electronic communication; in response to finding the first and second contact entries, compare a second contact communication identifier in each of the first and second contact entries with the subscriber identifier; and identify the second contact entry as the contact entry associated with the electronic communication in response to a match of the second contact communication identifier in the first contact entry to the subscriber identifier.

In yet another aspect of the present disclosure there is provided an electronic communications device, comprising: a processor; a memory connected to the processor for storing at least one address book having a plurality of contact entries, each contact entry storing a contact identity identifier and at least two contact communication identifiers; and computer-readable instructions, stored in the memory and executable on the processor for an identification software module, the identification module operable for: searching the address book for a first contact entry and a second contact entry, each of the first and second contact entries having a respective first contact communication identifier matching a predetermined communication identifier associated with an electronic communication; in response to finding the first and second contact entries, comparing a second contact communication identifier in each of the first and second contact entries with a subscriber identifier associated with the electronic communications device; and identifying the second contact entry as the contact entry associated with the electronic communication in response to a match of the second contact communication identifier in the first contact entry to the subscriber identifier.

Communications devices, such as cellular phones, personal digital assistants, or laptop computers are increasingly becoming popular. Communications devices are typically capable of initiating and receiving voice calls, as well as sending and receiving electronic messages such as e-mail, short messaging service (SMS), instant messaging, and the like. As an example, FIG. 1 is an illustration of an exemplary communications device 100. Communications device 100 has a screen 110 for displaying information, a keypad 120 for entering information such as composing e-mail messages, and a pointing device 130 such as a trackball for navigating through items on screen 110. Device 100 can also have a button 140 for initiating a phone application (not shown), and a button 150 for terminating phone calls.

Figure 2:
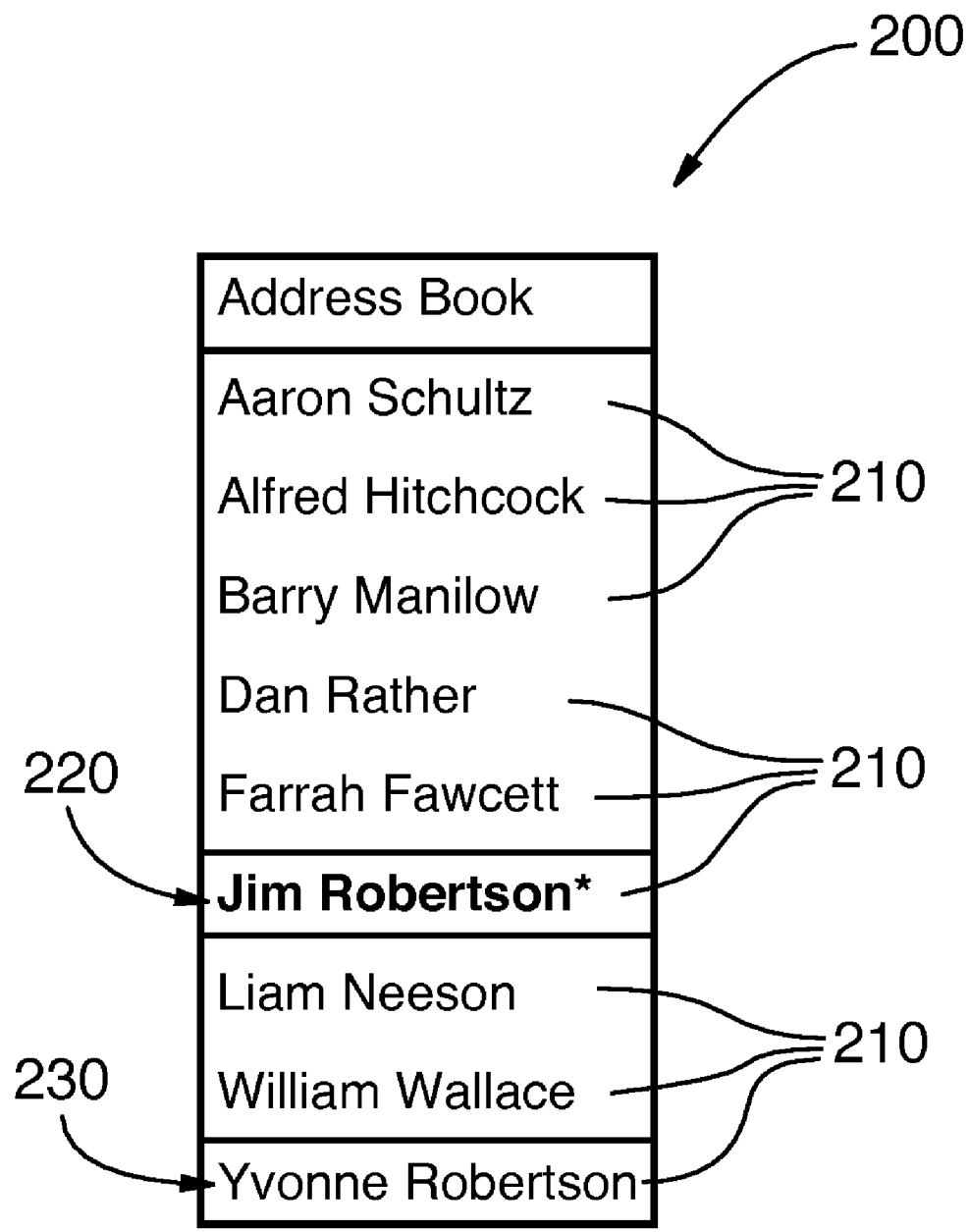
FIG. 2 is an illustration of an exemplary electronic address book having a plurality of contact entries, operable on the communications device of FIG. 1.

A communications device typically has an electronic address book associated with it. The address book contains a plurality of contact entries suitable for storing contact information, for the communications device's subscriber as well for his or her contacts such as friends, family, or acquaintances. As an example, FIG. 2 is an illustration of an exemplary electronic address book 200 having a plurality of contact entries 210, operable on communications device 100 of FIG. 1. Among the plurality of entries 210, address book 200 has a contact entry 220 for the subscriber of the device, marked with an asterisk, and a contact entry 230 for the subscriber's spouse.

Figure 3:
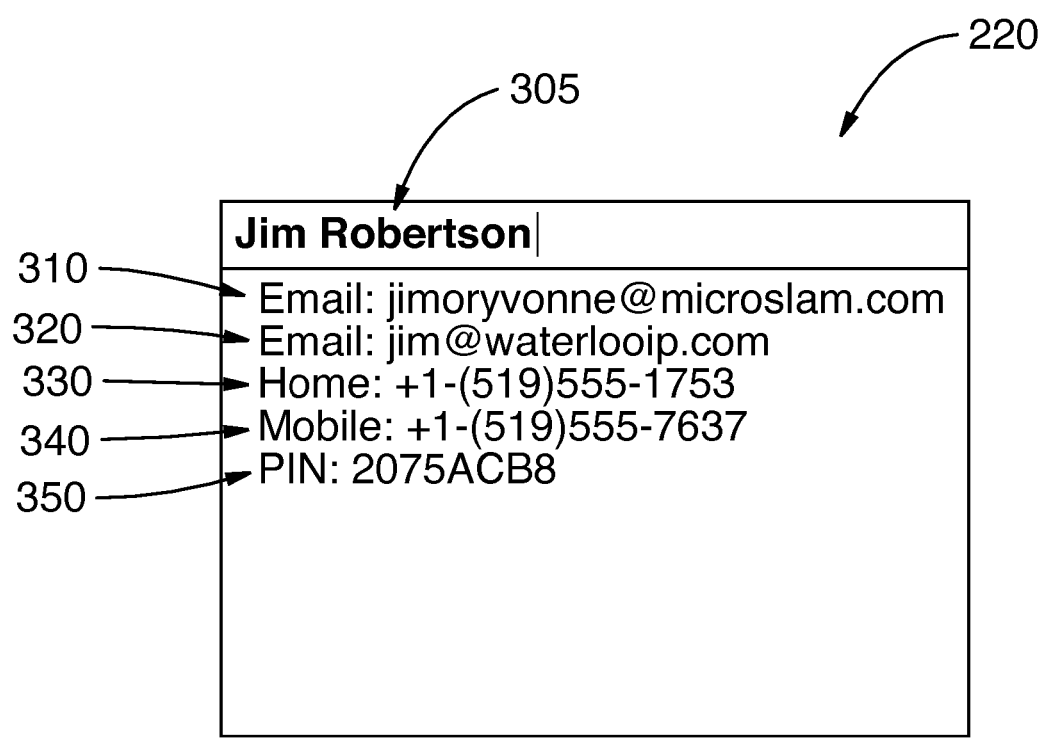
FIG. 3 is a detailed illustration of an exemplary contact entry containing contact information corresponding to the subscriber of the communications device of FIG. 1.

Each contact entry includes identifiers associated with the corresponding contact. Some of the identifiers are contact identity identifiers such as a name, while other identifiers are contact communication identifiers such as a phone number, an e-mail address, or a personal identification number (PIN) associated with the contact. As an example, FIG. 3 is a detailed illustration of contact entry 220 from FIG. 2. Contact entry 220 contains contact information corresponding to the subscriber of the communications device 100 of FIG. 1. Specifically, entry 220 contains a contact identity identifier 305 showing the subscriber's name, and contact communication identifiers 310, 320, 330, 340, and 350. Contact communication identifier 310 is the address of an E-mail account shared between the device's subscriber and his spouse. Contact communication identifier 320 is the address of an E-mail account that belongs to the device's subscriber. Contact communication identifier 330 is the home phone number of the device's subscriber and his spouse. Contact communication identifier 340 is the mobile phone number of the device's subscriber. Contact communication identifier 350 is a PIN associated with the device's subscriber.

Figure 4:
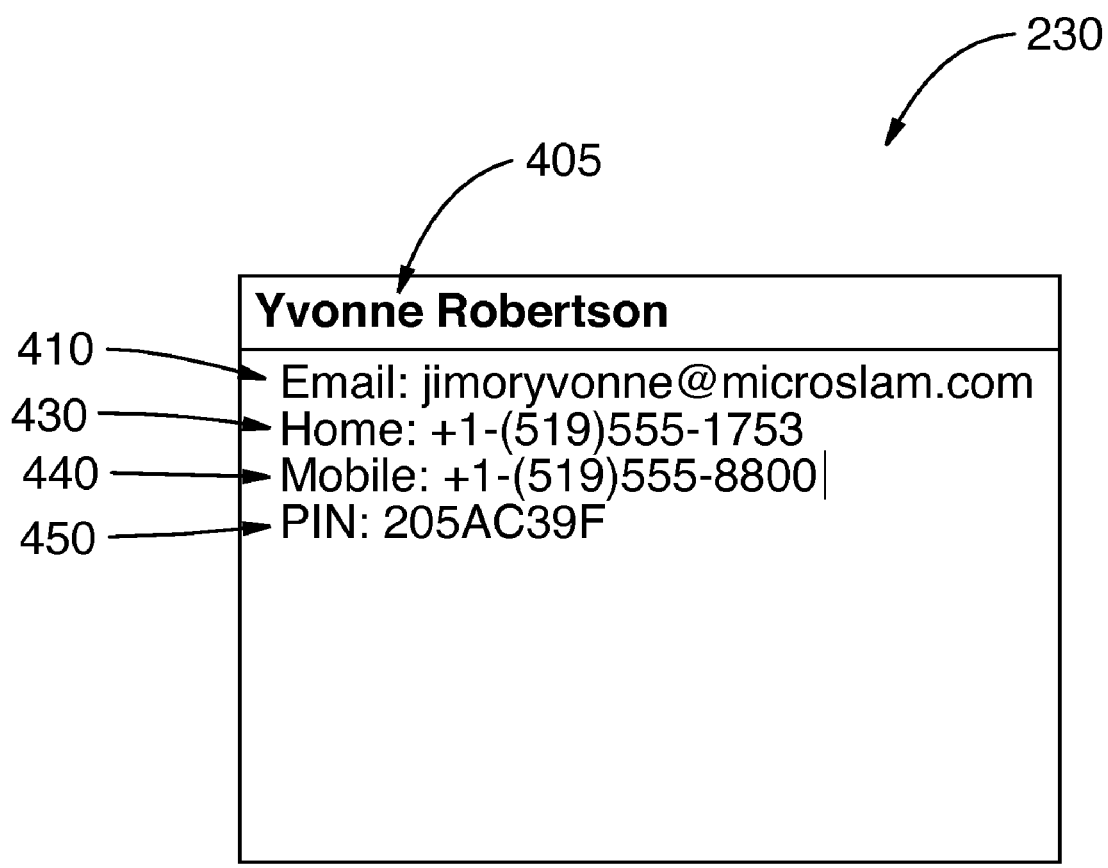
FIG. 4 is a detailed illustration of an exemplary contact entry containing contact information corresponding to the spouse of the subscriber of the communications device of FIG. 1.

As another example, FIG. 4 is a detailed illustration of contact entry 230 from FIG. 2. Contact entry 230 contains contact information corresponding to the spouse of the subscriber of communications device 100 of FIG. 1. Specifically contact entry 230 contains a contact identity identifier 405 showing the subscriber's spouse's name, and contact communication identifiers 410, 430, 440, and 450. Contact communication identifier 410 is the address of an E-mail account shared between the device's subscriber and his spouse. Contact communication identifier 430 is the home phone number of the device subscriber's spouse and the device subscriber's. Contact communication identifier 440 is the device subscriber's spouse's mobile phone number. Contact communication identifier 450 is a PIN associated with the device subscriber's spouse.

Figure 5A:
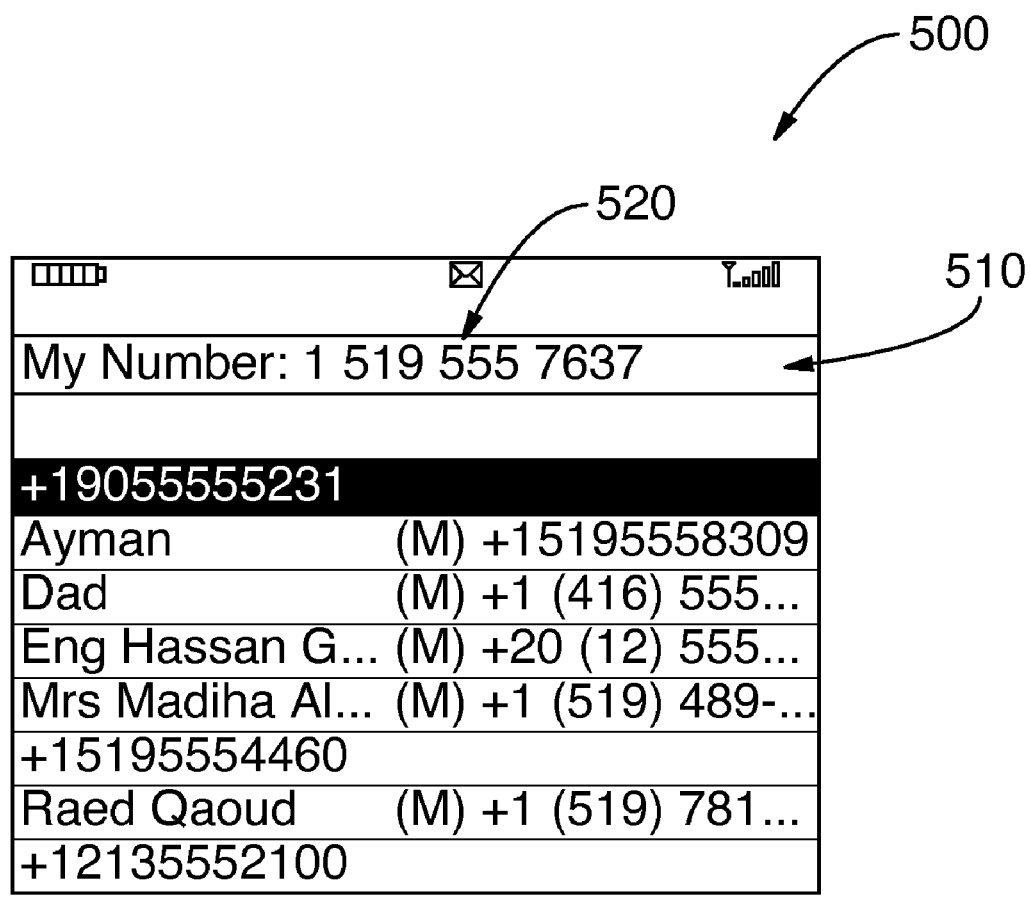
FIG. 5A is an illustration of an exemplary phone application screen displayable on the communications device of FIG. 1.
Figure 5B:
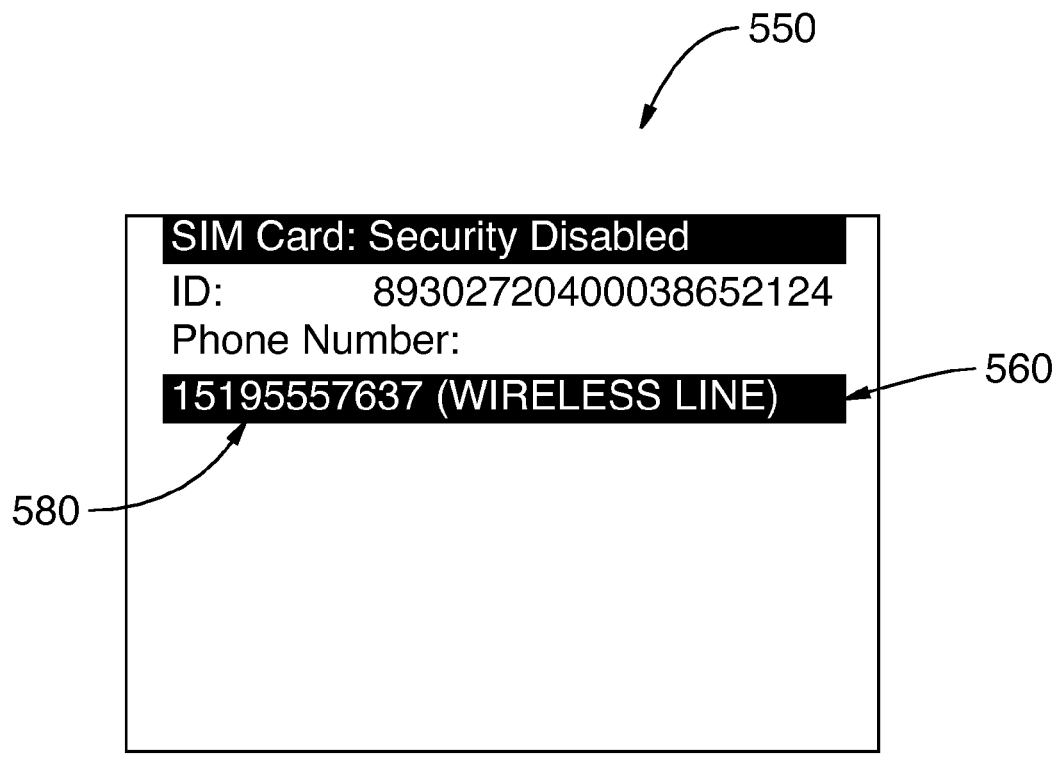
FIG. 5B is an illustration of an exemplary Subscriber Identity Module (SIM) information screen displayable on the communications device of FIG. 1.

A communications device has one or more subscriber identifiers associated with it. In some implementations, the subscriber identifier is a phone number, an e-mail address, or a PIN. A phone number can be stored on a subscriber identity module (SIM) or on other means on the communications device, such as non-volatile random access memory (NVRAM). As an example, FIG. 5A is an illustration of an exemplary phone app (application) screen 500 displayable on the communications device 100 of FIG. 1. Screen 500 includes field 510 displaying telephone number 520 associated with communications device 100. As another example, FIG. 5B is an illustration of an exemplary Subscriber Identity Module (SIM) information screen 550 displayable on the communications device 100 of FIG. 1. Information screen 550 contains field 560 displaying telephone number 580 associated with communications device 100 and stored on a SIM associated with device 100.

Figure 6:
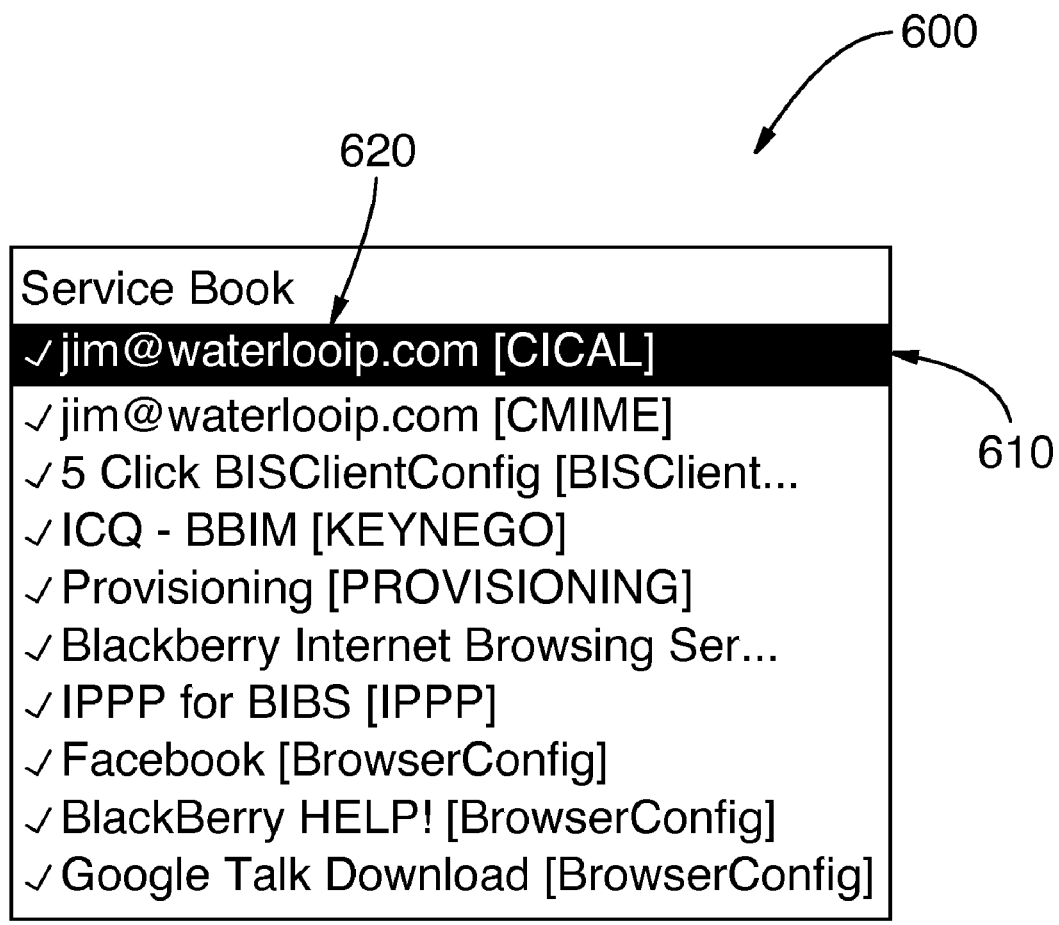
FIG. 6 is an illustration of an exemplary service book screen showing the various communications services supported by the communications device of FIG. 1.

In an exemplary implementation, a subscriber identifier associated with a communications device is an e-mail address. As an example, FIG. 6 is an illustration of an exemplary service book screen 600 showing the various communications services supported by the communications device 100 of FIG. 1. Screen 600 contains a field 610 displaying e-mail address 620 provisioned for use by the subscriber of communications device 100.

Figure 7:
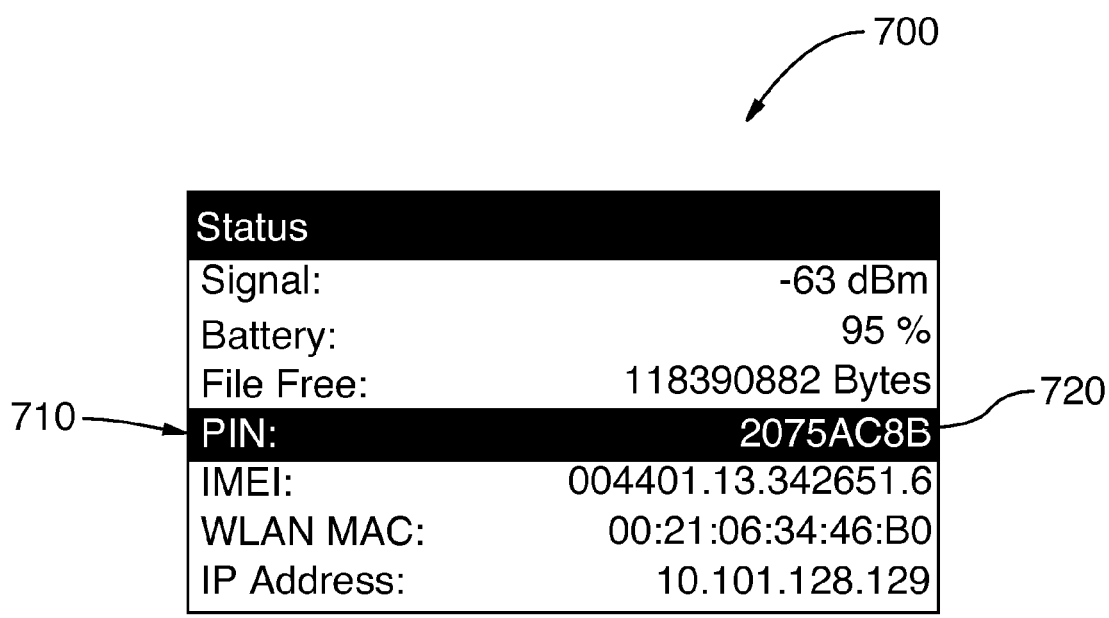
FIG. 7 is an illustration of a personal identification number (PIN) information screen displayable on the communications device of FIG. 1.

In another exemplary implementation, a subscriber identifier associated with a communications device is a personal identification number (PIN). In some implementations, the PIN is stored in NVRAM or on other non-volatile means on communications device 100. As an example, FIG. 7 is an illustration of a personal identification number (PIN) information screen 700 displayable on the communications device 100 of FIG. 1. Screen 700 contains field 710 displaying PIN 720 associated with device 100.

When an incoming communication such as a voice call, or an e-mail message, arrives at a communications device, the incoming communication includes a predetermined communication identifier, such as a phone number or an e-mail address. Upon receiving the incoming communication, an identification module 104 in FIG. 23 associated with the communications device identifies the contact entry associated with the incoming communication as will be described below.

Figure 8:
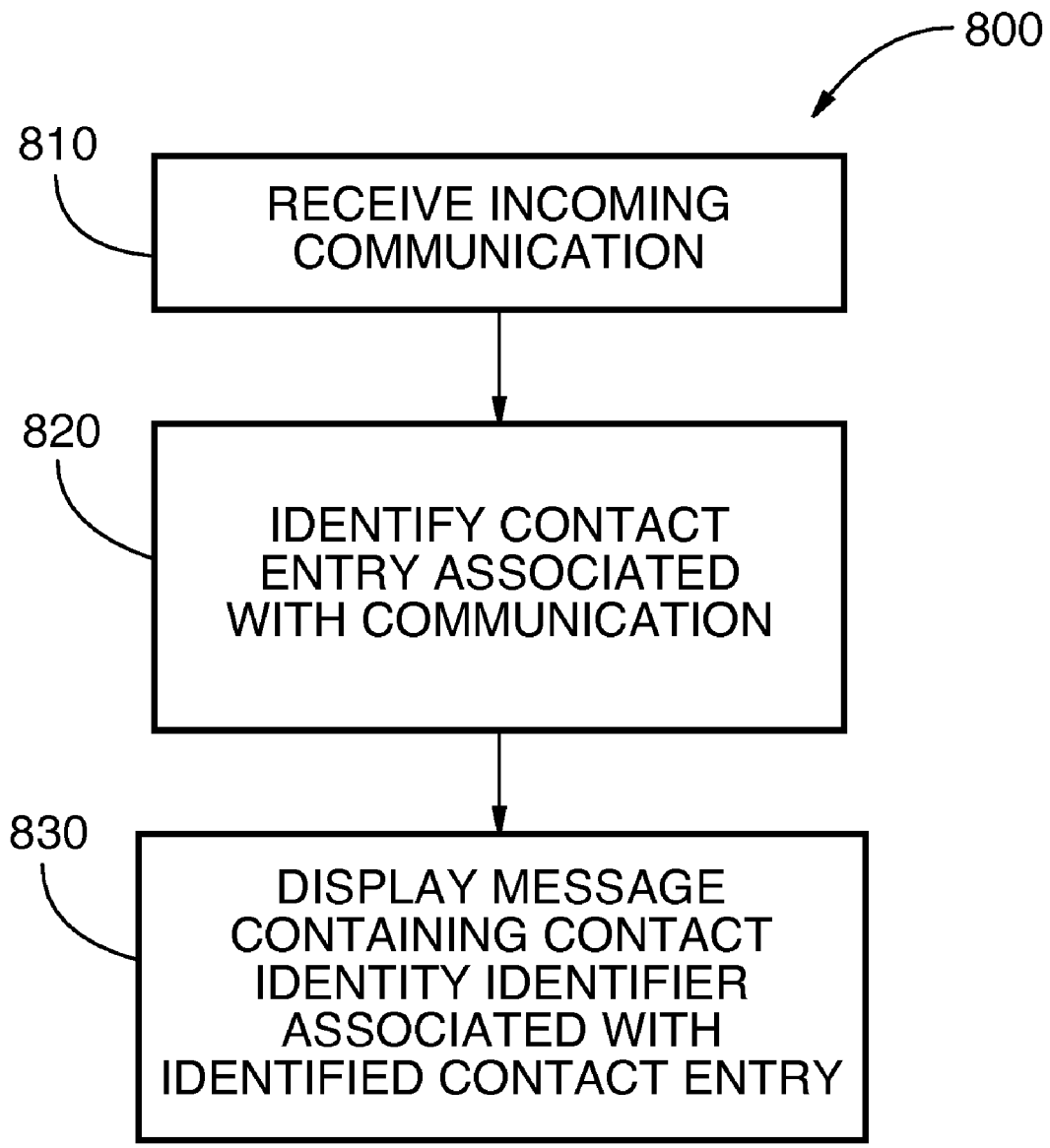
FIG. 8 is a high-level flow chart of a method for identifying a contact entry associated with an incoming communication.

FIG. 8 is a high-level flow chart of a method 800 for identifying a contact entry associated with an incoming communication. Method 800 starts with block 810 at which an incoming communication is received at a communications device such as communications device 100. At block 820 a contact entry associated with the initiator of the incoming communication is identified. At block 830 a message is displayed containing the contact identity identifier of the contact entry determined in block 820.

Figure 11:
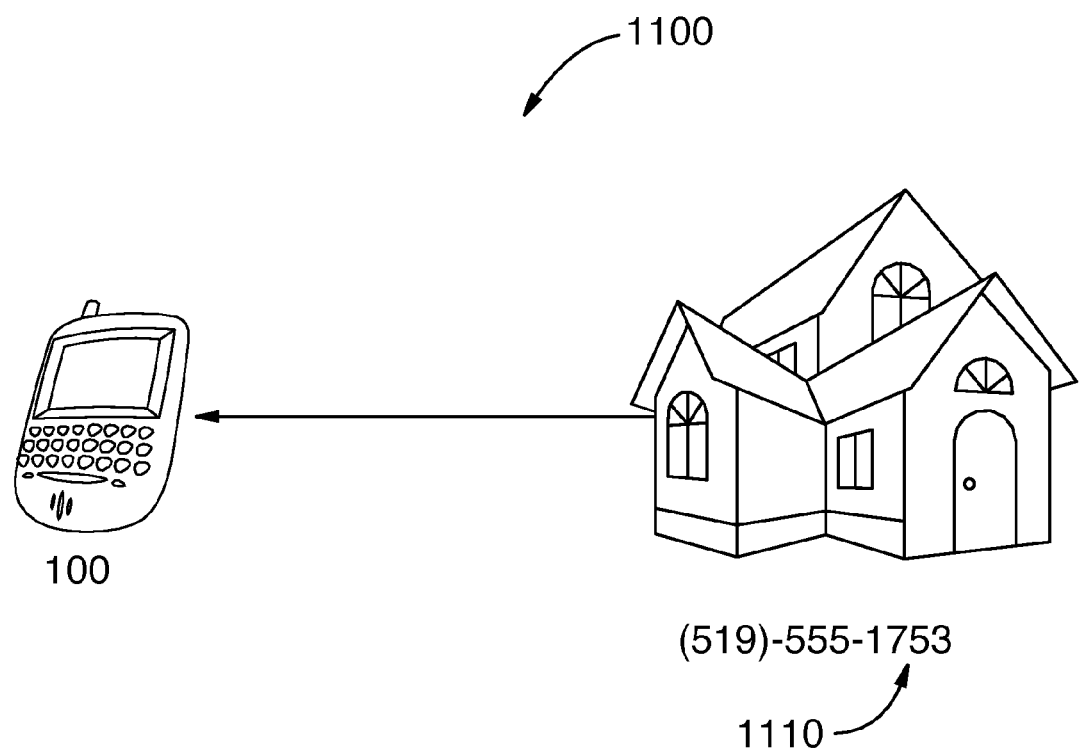
FIG. 11 is an illustration of an incoming phone call from the home phone of the subscriber of the communications device of FIG. 1 to the communications device of FIG. 1.
Figure 16:
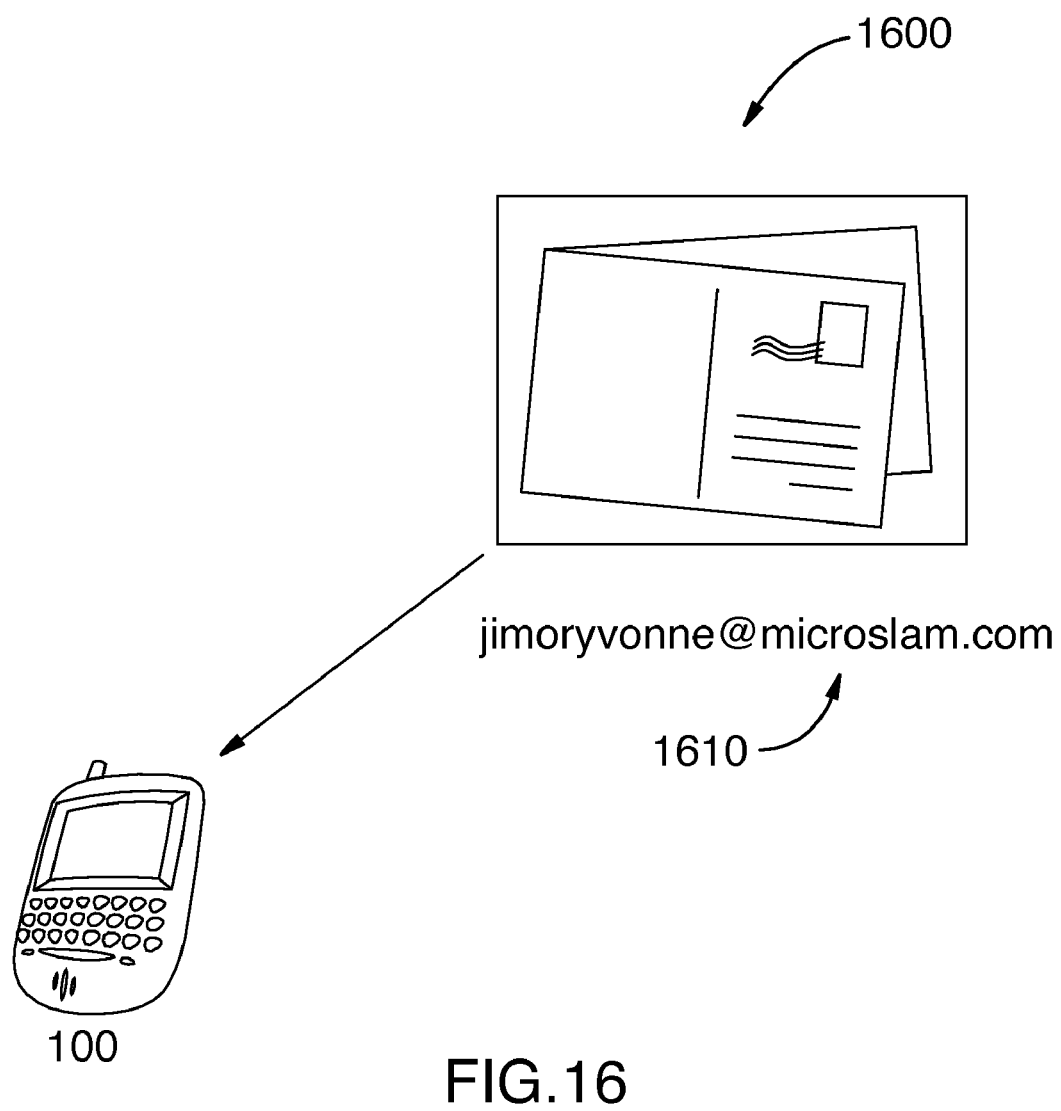
FIG. 16 is an illustration of an incoming e-mail message from an e-mail address shared between the communications device's subscriber whose contact entry is in FIG. 3 and the communications device subscriber's spouse whose contact entry is in FIG. 4, the message arriving at the communications device of FIG. 1.

As an example of an incoming communication received in block 810, FIG. 11 is an illustration of an incoming phone call from the home phone 1110 of the subscriber of the communications device 100 to the communications device 100. As another example of an incoming communication received in block 810, FIG. 16 is an illustration of an incoming e-mail message 1600 from an e-mail address 1610 shared between communications device 100's subscriber whose contact entry is 220 in FIG. 3 and the communications device 100 subscriber's spouse whose contact entry is 230 in FIG. 4, the message arriving at the communications device 100.

Figure 12:
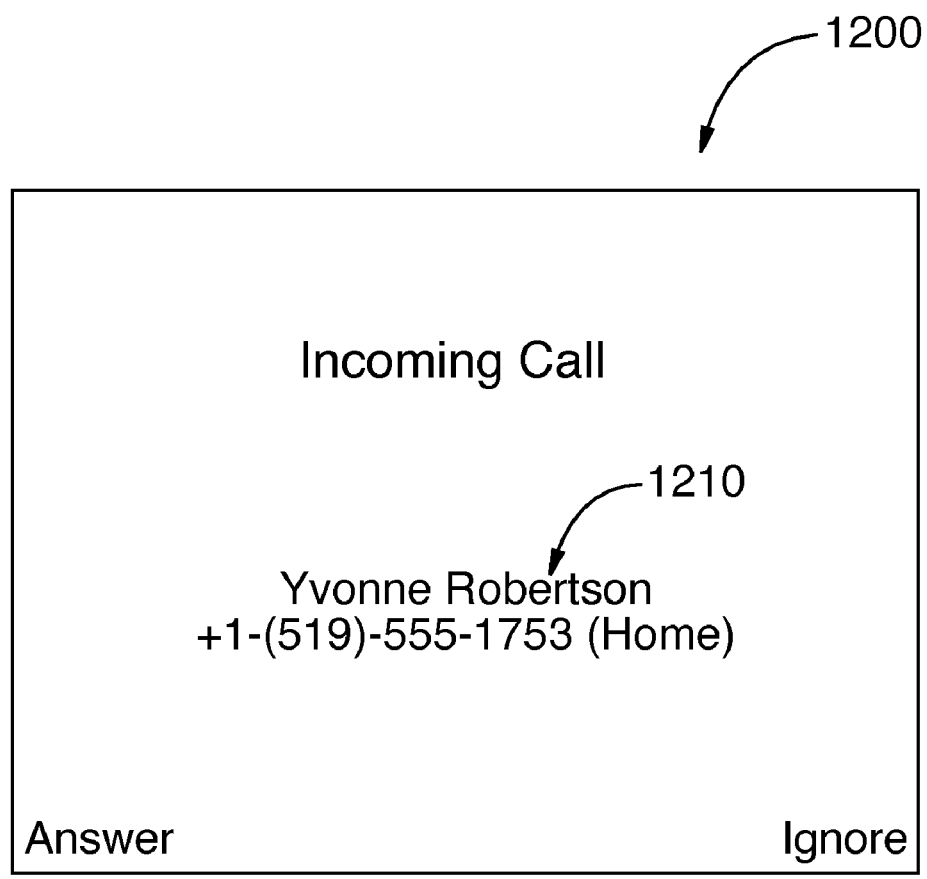
FIG. 12 is an illustration of an exemplary caller identification screen that is displayed when the incoming phone call of FIG. 11 arrives at the communications device of FIG. 1, in accordance with an implementation of the present disclosure.
Figure 17:
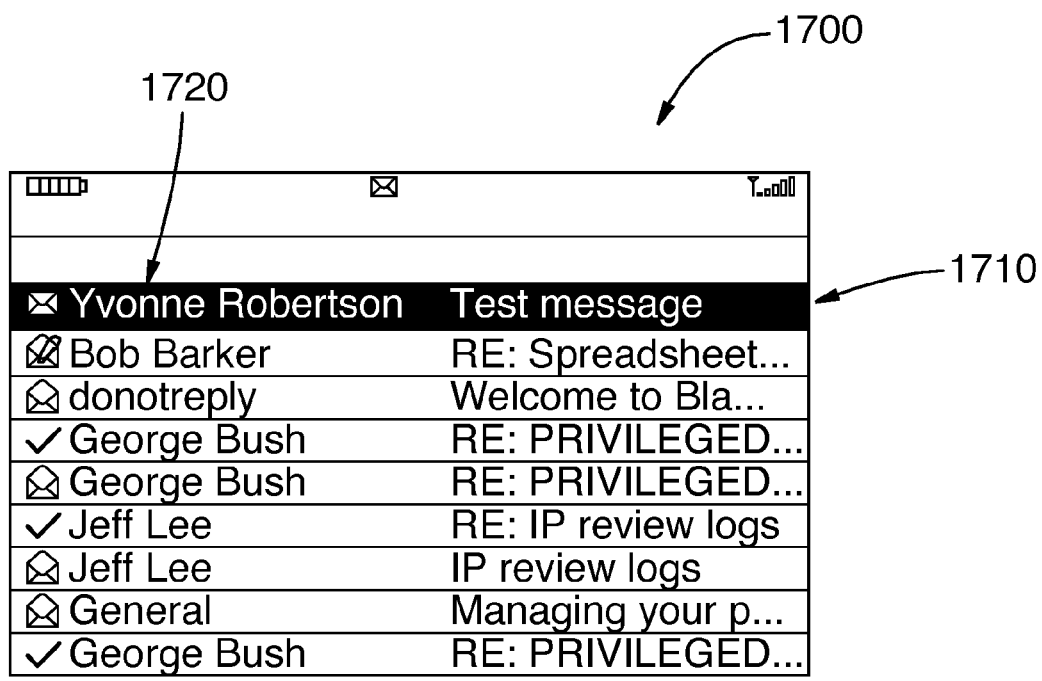
FIG. 17 is an illustration of an exemplary e-mail message list screen that can be displayed when the e-mail message of FIG. 16 arrives at the communications device of FIG. 1, in accordance with yet another implementation of the present disclosure.
Figure 18:
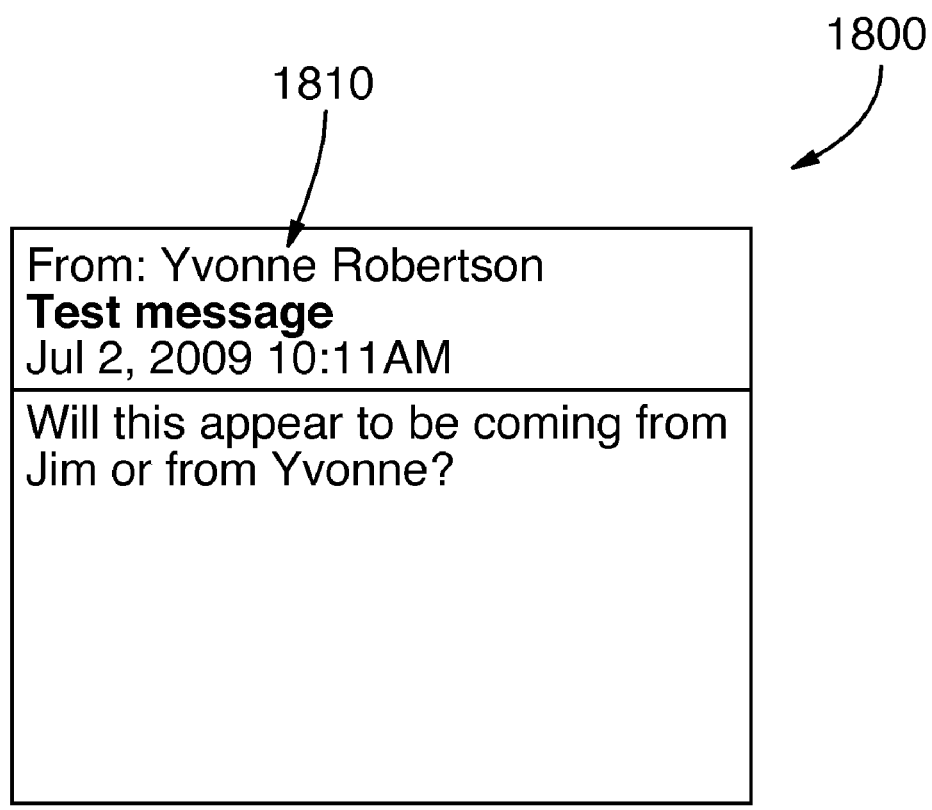
FIG. 18 is an illustration of an exemplary e-mail message preview screen that can be displayed when the e-mail message of FIG. 16 is opened for preview at the communications device of FIG. 1, in accordance with an implementation of the present disclosure.

In block 830, the contact's identity is announced, for example by displaying the contact's identity identifier on a display 110 associated with communications device 100. In some implementations, displaying the contact's identity identifier is carried out by a displaying module 105 in FIG. 23. As an example of the message displayed in block 830, FIG. 12 is an illustration of an exemplary caller identification screen 1200 that is displayed when the incoming phone call 1100 of FIG. 11 arrives at communications device 100. Contact identity identifier 1210 is displayed to show the contact associated with the incoming phone call. As another example of the message displayed in block 830, FIG. 17 is an illustration of an exemplary e-mail message list screen 1700 that is displayed when the e-mail message of FIG. 16 arrives at the communications device 100. Message list screen 1700 comprises a plurality of message list entries each indicating a sender of a message and a subject line associated with the message. E-mail message 1600 from FIG. 16 is shown in entry 1710 wherein the contact identity identifier 1720 of the subscriber's spouse is displayed. Similarly, FIG. 18 is an illustration of an exemplary e-mail message preview screen 1800 that can be displayed when the e-mail message of FIG. 16 is opened for preview at the communications device. Preview screen 1800 includes contact identify identifier 1810 indicating that the sender of the e-mail message 1600 is the device subscriber's spouse.

Figure 23:
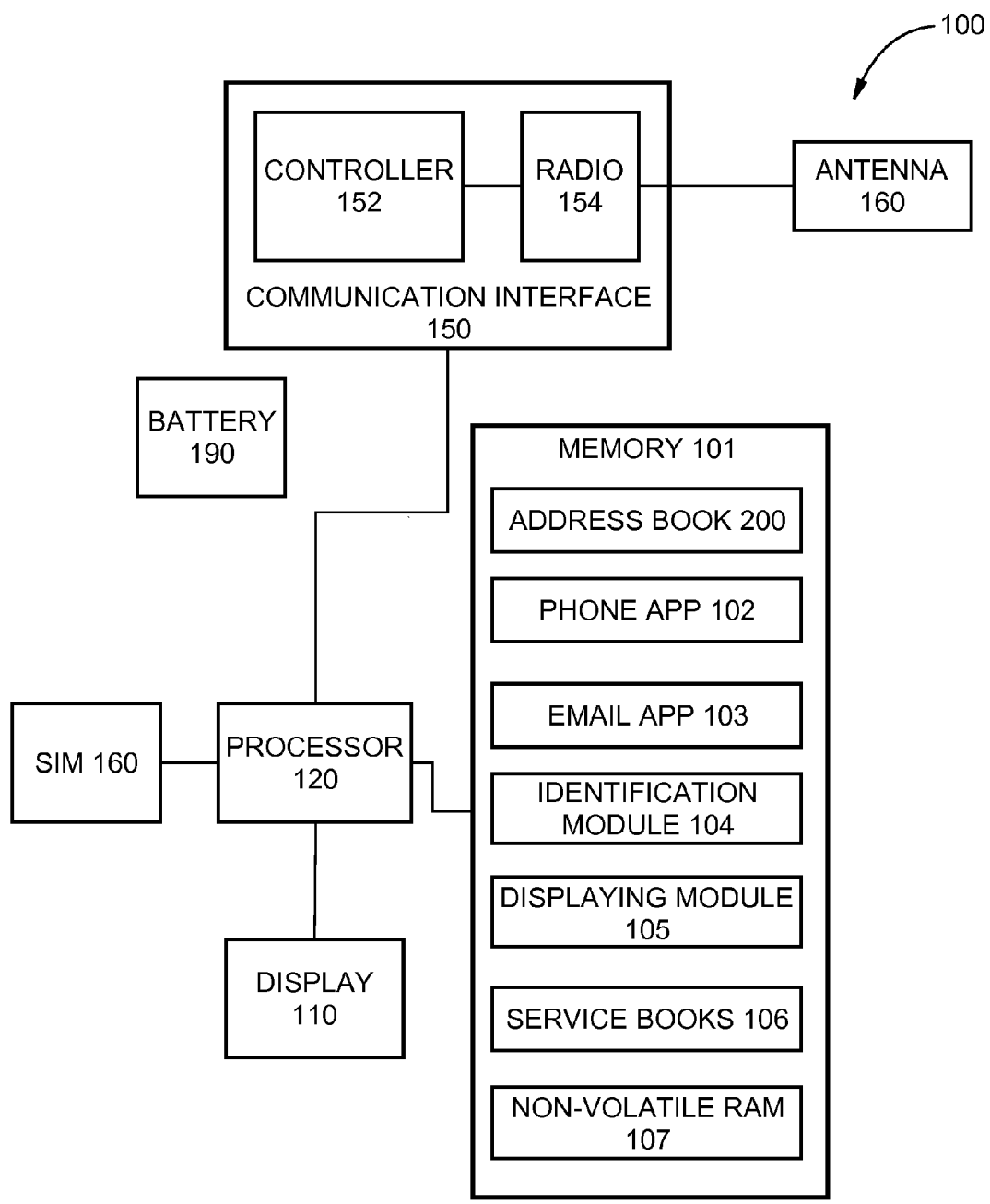
FIG. 23 is a block diagram illustration of the components of the communications device of FIG. 1.

When an outgoing communication is initiated from the communications device, the outgoing communication specifies a predetermined communication identifier such as a phone number or an e-mail address as the destination of the outgoing communication, in which case, the identification module 104 in FIG. 23 identifies the contact entry for the contact receiving the outgoing communication.

Figure 9:
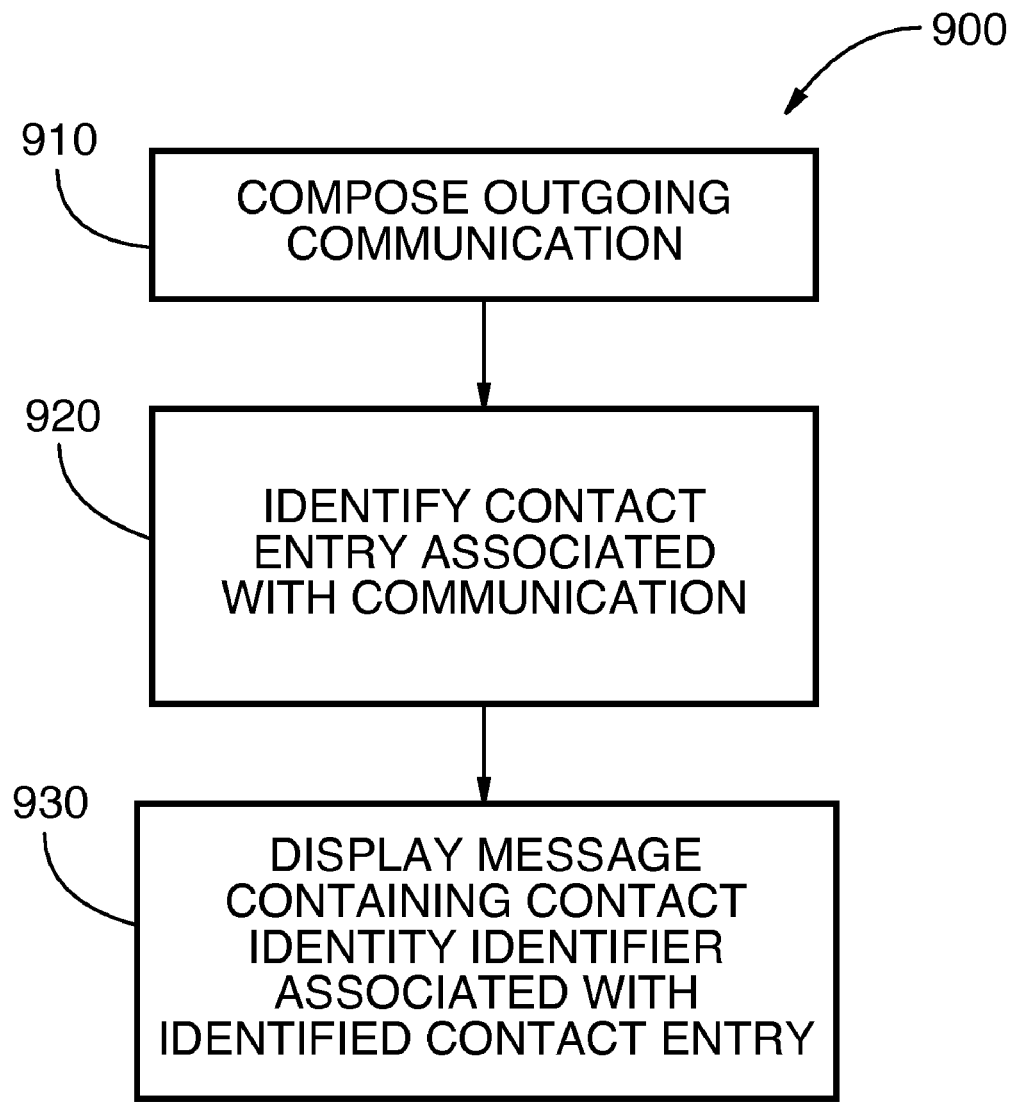
FIG. 9 is a high-level flow chart of a method for identifying a contact entry associated with an outgoing communication.

FIG. 9 is a high-level flow chart of a method 900 for identifying a contact entry associated with an outing communication. Method 900 starts with block 910 at which an outgoing communication is composed at a communications device such as communications device 100. At block 920 a contact entry associated with the recipient of the outgoing communication is identified in a manner that will be outlined below. At block 930 a message is displayed containing the contact identity identifier of the contact entry determined in block 920.

Figure 13:
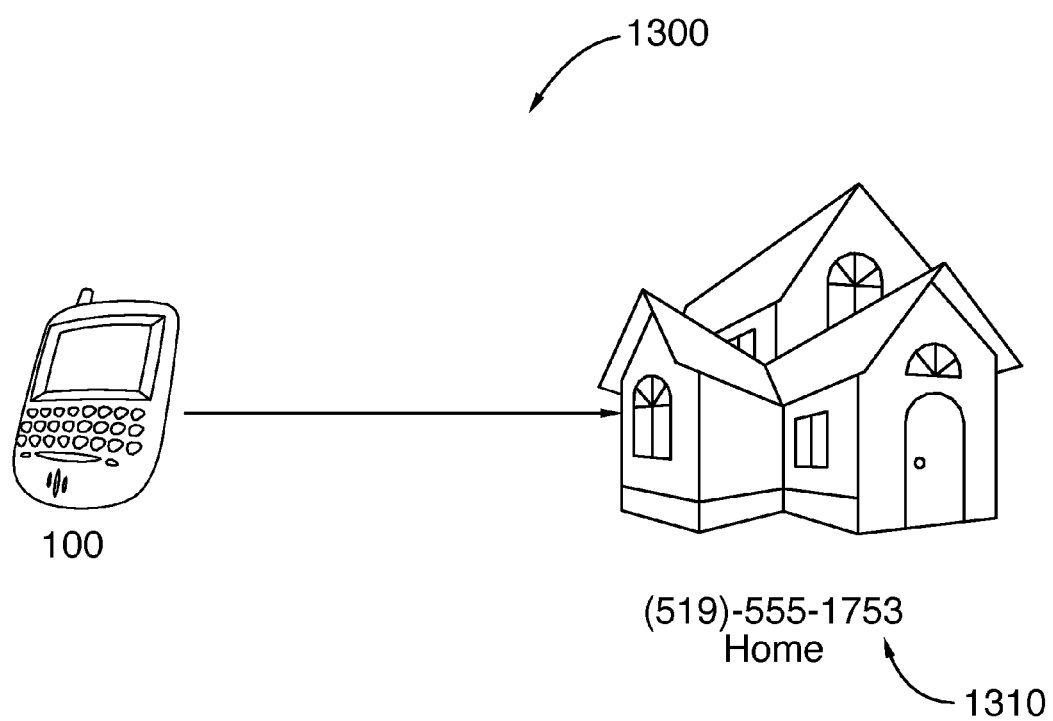
FIG. 13 is an illustration of an outgoing phone call from the communications device of FIG. 1, to the communications device subscriber's home phone number.
Figure 14:
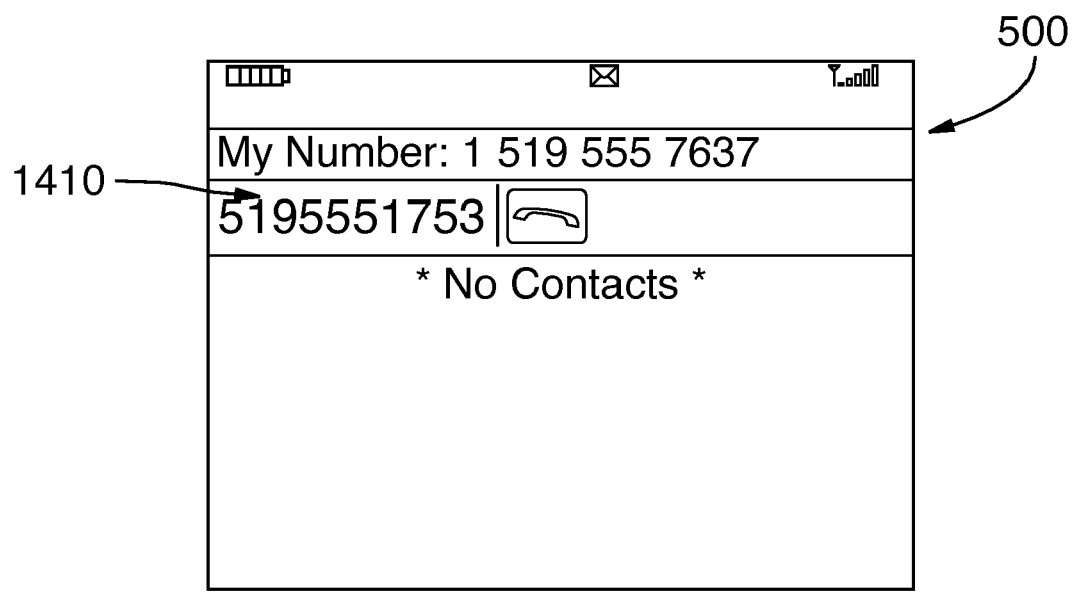
FIG. 14 is an illustration of the subscriber's home phone number being dialled using the exemplary phone application screen of FIG. 5A.

As an example of an outgoing communication composed in block 910, FIG. 13 is an illustration of an outgoing phone call 1300 to the home phone 1310 of the subscriber of the communications device 100 being dialled at communications device 100. FIG. 14 is an illustration of the subscriber's home phone number 1410 being dialled using the exemplary phone application screen of FIG. 5A.

Figure 19:
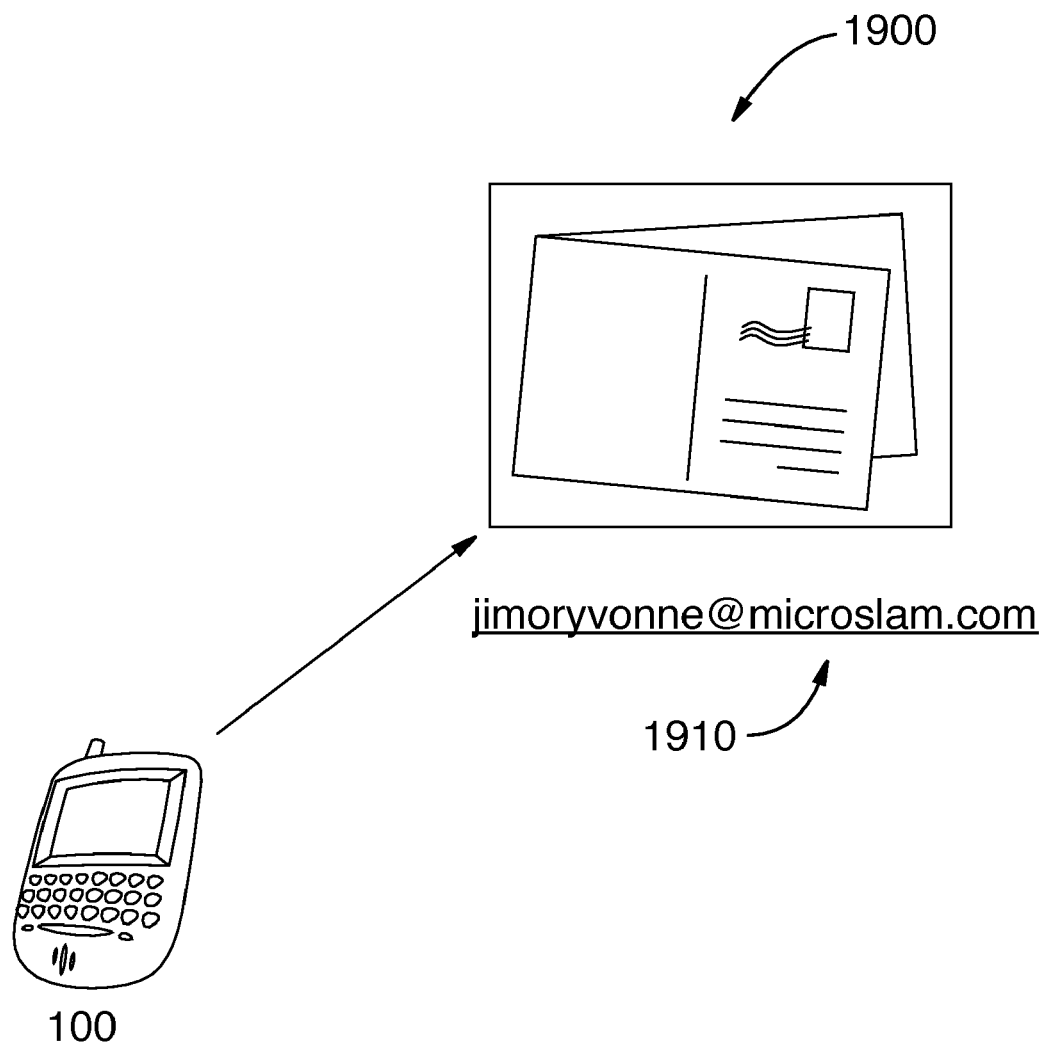
FIG. 19 is an illustration of an exemplary outgoing e-mail message originating from the communications device of FIG. 1 to an e-mail address shared between the communications device's subscriber whose contact entry is in FIG. 3 and the communications device subscriber's spouse whose contact entry is in FIG. 4.
Figure 20:
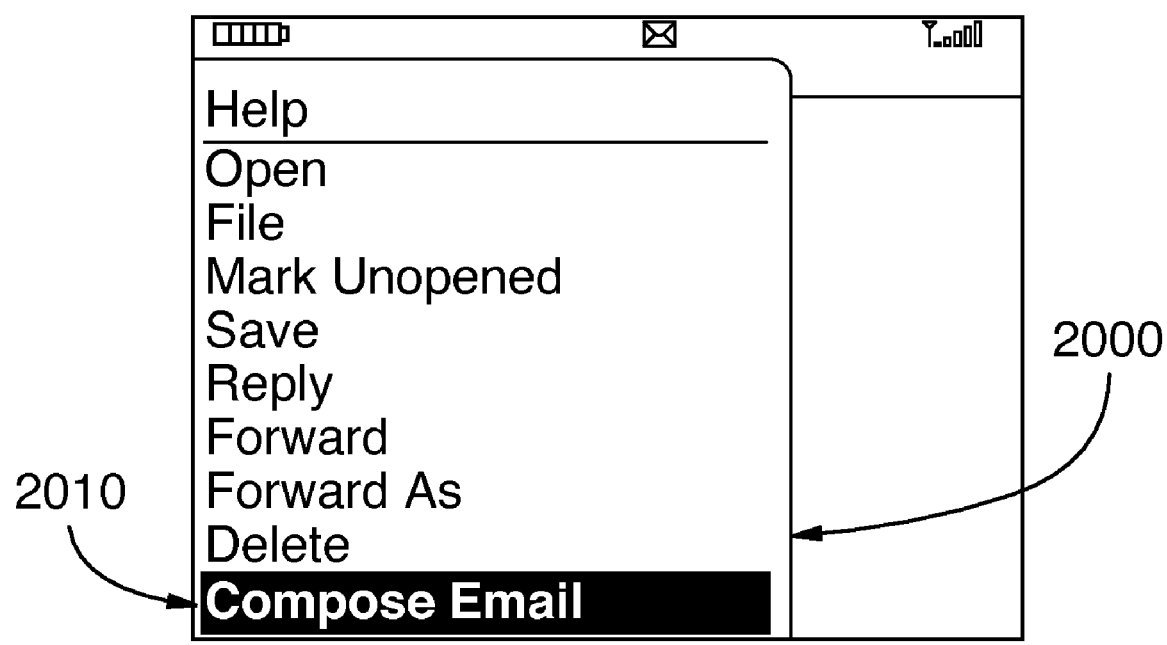
FIG. 20 is an illustration of an exemplary e-mail application menu including an e-mail compose menu item, the menu displayable on the communications device of FIG. 1.

As another example of an outgoing communication composed in block 910, FIG. 19 is an illustration of an exemplary outgoing e-mail message 1900 originating from communications device 100 to e-mail address 1910 which is shared between the communications device's subscriber whose contact entry 220 is in FIG. 3 and the communications device subscriber's spouse whose contact entry 230 is in FIG. 4. Reference is now made to FIG. 20 which is an illustration of an exemplary e-mail application menu 2000 including an e-mail compose menu item 2010, menu 2000 being displayable on communications device 100. The composition of outgoing e-mail message 1900 can be initiated by activating e-mail compose menu item 2010.

Figure 21:
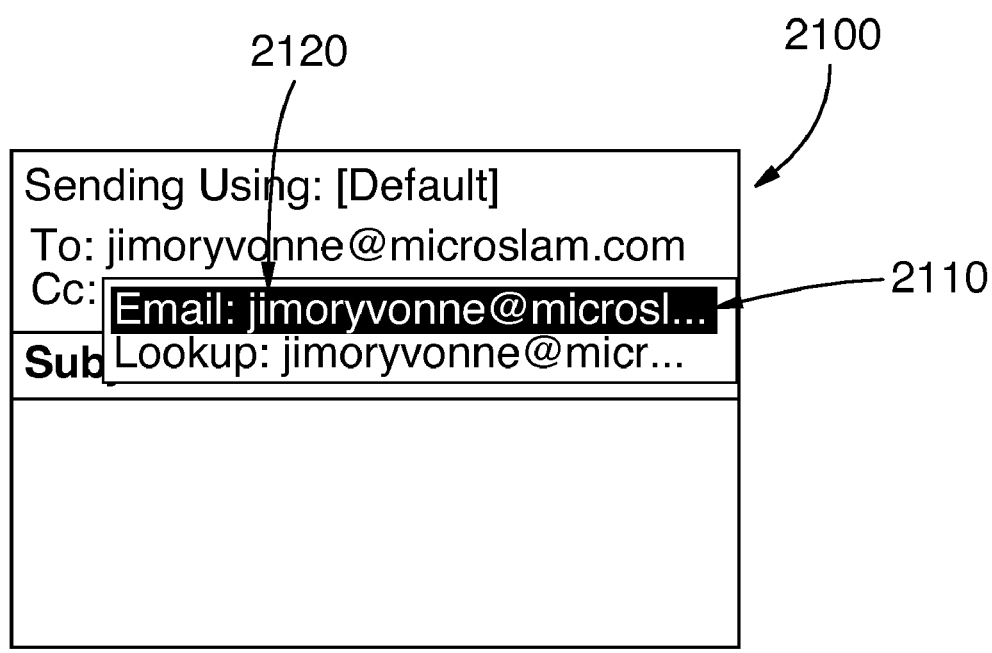
FIG. 21 is an illustration of an exemplary e-mail compose screen on the communications device of FIG. 1 wherein an e-mail address shared between the communications device subscriber and the communications device subscriber's spouse, is entered as the destination of an e-mail message being composed at the communications device of FIG. 1.

Reference is now made to FIG. 21 which is an illustration of an exemplary e-mail compose screen 2100 that can be activated via menu item 2010. E-mail compose screen 2100 includes an e-mail recipient address field 2110. As can be seen e-mail address 2120 which is shared between the communications device subscriber and the communications device subscriber's spouse, is entered as the destination of the e-mail message being composed.

Figure 15:
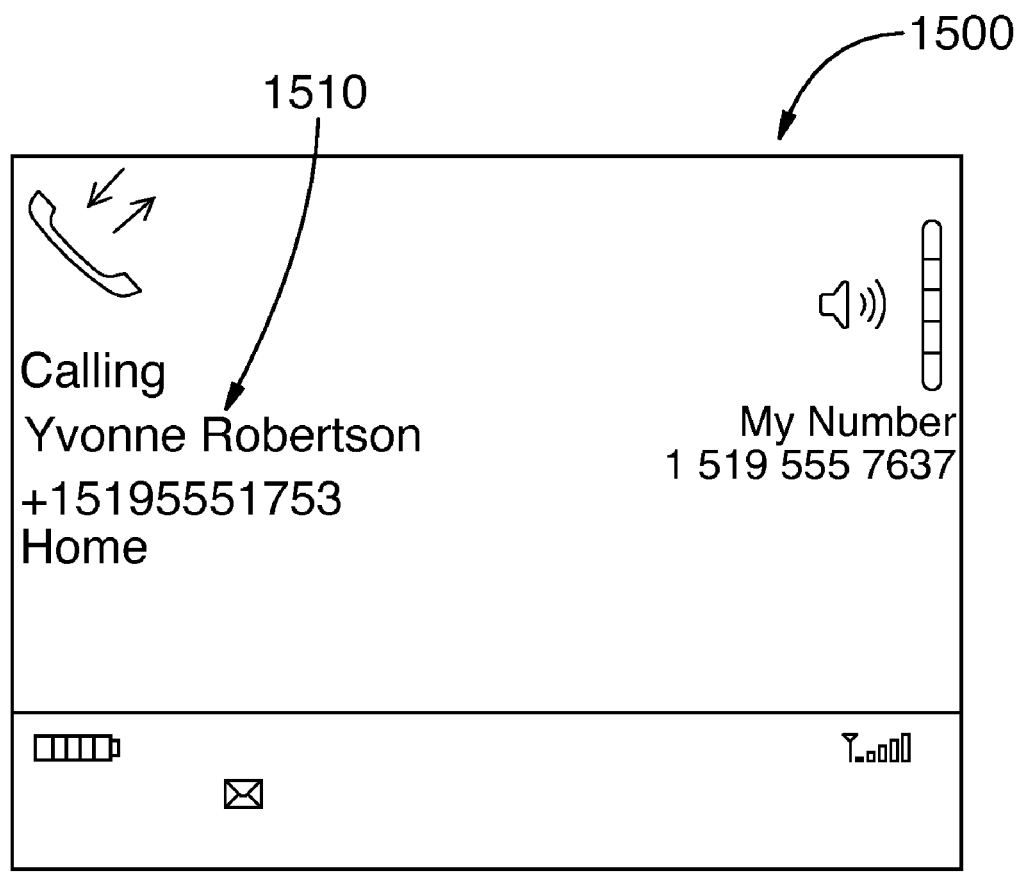
FIG. 15 is an illustration of an exemplary call recipient identification screen that is displayed at the communications device of FIG. 1 when the outgoing call of FIG. 13 is placed from the communications device, in accordance with an implementation of the present disclosure.

At block 930, the identity of the contact that is the recipient of the communication composed in block 910 is announced. In some implementations, announcing the identity of the contact is carried out by a displaying module 105 in FIG. 23. The displaying module displays a message containing the contact's identity identifier on a display associated with the communications device, such as display 110. As an example of the message displayed in block 930, FIG. 15 is an illustration of an exemplary call recipient identification screen 1500 that is displayed at communications device 100 when the outgoing call of FIG. 13 is placed from communications device 100, in accordance with an implementation of the present disclosure. Contact identity identifier 1510 is displayed on display 110 to show that the contact associated with the outgoing phone call is the device subscriber's spouse.

Figure 22:
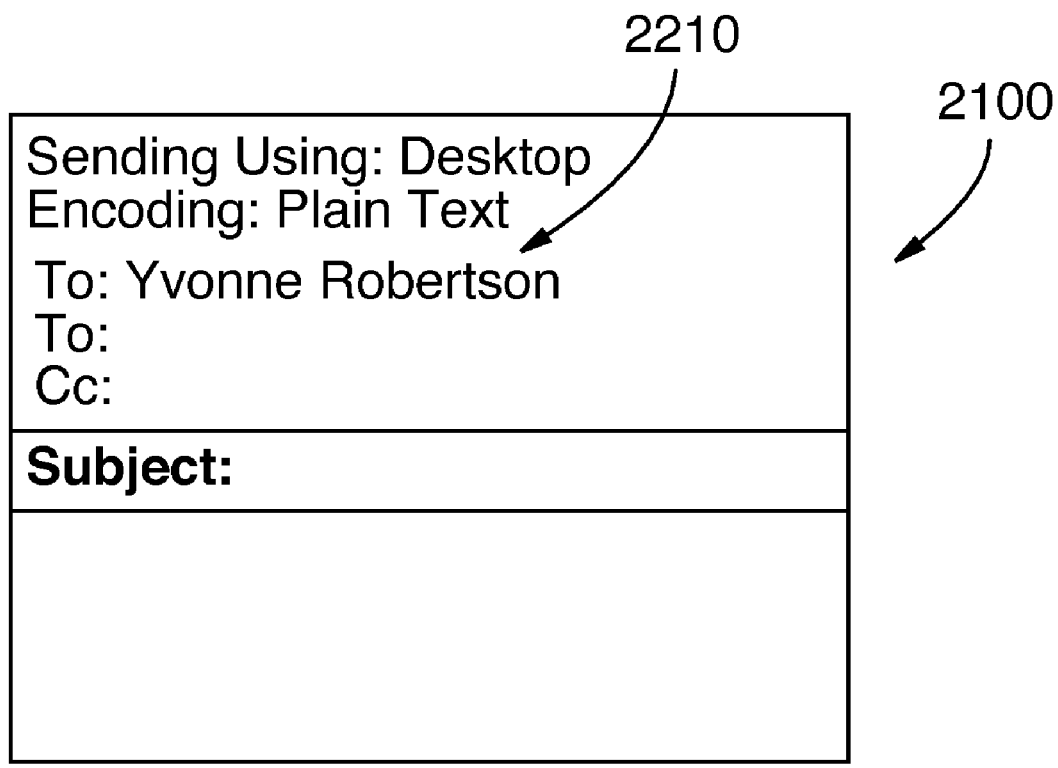
FIG. 22 is an illustration of the e-mail compose screen of FIG. 21 wherein the e-mail address entered has been replaced with the corresponding contact name, in accordance with an implementation of the present disclosure.

As another example of the message displayed in block 930, FIG. 22 is an illustration of the e-mail compose screen 2100 of FIG. 21 wherein the e-mail address entered 2120 has been replaced with contact identify identifier 2210 name, in accordance an implementation of the present disclosure.

Figure 10:
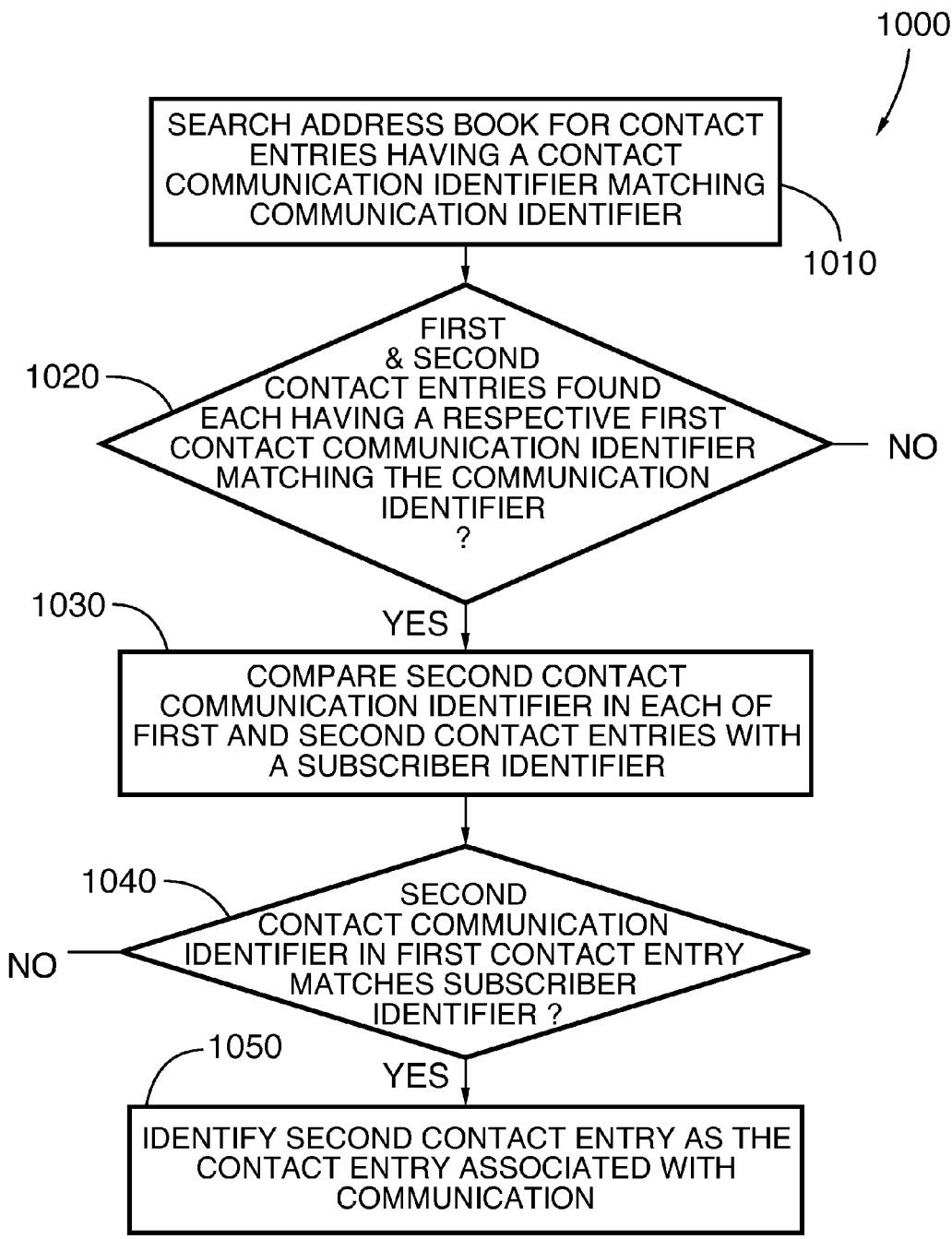
FIG. 10 is a detailed flow chart of a method for identifying a contact entry associated with a communication in accordance with an implementation of the present disclosure.

Reference is now made to FIG. 10 which is a detailed flow chart of a method 1000 of blocks 820 and 920 for identifying a contact entry associated with a communication in accordance with an implementation of the present disclosure. Consider, for example a communication identified by a predetermined communication identifier. Examples of such communication are: the incoming call 1100 of FIG. 11 identified by predetermined communication identifier 1110 which is the home phone number of both the device's subscriber and his spouse, the outgoing call 1300 of FIG. 13 identified by predetermined communication identifier 1310 which is also the home phone number of both the device's subscriber and his spouse, the incoming e-mail message 1600 of FIG. 16 identified by predetermined communication identifier 1610 which is an e-mail address shared between the device's subscriber and his spouse, or the outgoing e-mail message 1900 identified by predetermined communication identifier 1910 which is also an e-mail address shared between the device's subscriber and his spouse.

At block 1010, the address book 200 of communications device 100 is searched. In some implementations, the search at block 1010 is performed by an identification module 104 in FIG. 23, or a search module (not shown). Contact communication identifiers in contact entries 210 of address book 200 are compared with the predetermined communication identifier of the communication such as predetermined communication identifier 1110, 1310, 1610, or 1910.

At block 1020 a determination is made as to whether two contact entries each having a respective first contact communication identifier matching the predetermined communication identifier are present in the address book. In some implementations, the determination is made by an identification module 104 in FIG. 23. For example, each of predetermined communication identifier 1110 of phone call 1100 of FIG. 11 and predetermined communication identifier 1310 of phone call 1300 of FIG. 13 matches the contact communication identifier 330 in contact entry 220 and contact communication identifier 430 in contact entry 230. As another example, each of predetermined communication identifier 1610 of e-mail message 1600 of FIG. 16 and predetermined communication identifier 1910 of e-mail message 1900 of FIG. 19, matches contact communication identifier 310 in contact entry 220 and contact communication identifier 410 in contact entry 230. In any of the previous cases method 1000 continues at block 1030. If there is no match with two contact entries, method 1000 terminates. An alternate method whereby only one contact entry's contact communication identifier is compared with the communication identifier is run (not shown). If there is a match then the contact entry is identified as associated with the communication as is conventionally done.

At block 1030 a second contact communication identifier in each of the two contact entries is compared with the subscriber identifier associated with device 100. Examples of a second contact communication identifier are: e-mail address 320, mobile phone number 340, or PIN 350 in contact entry 220; and mobile phone number 440, or PIN 450 in contact entry 230. These contact communication identifiers are compared with subscriber identifiers of the same type. As an example contact communication identifiers which are phone numbers such as 340 and 440, are compared with phone number 520 shown in SIM info screen 550 or compared with phone number 580 in phone app screen 500. As another example contact communication identifiers which are e-mail addresses such as 320 in contact entry 220 are compared with e-mail address 620 in service book info screen 600. As yet another example, contact communication identifiers which are personal identification numbers (PINs) such as 350 in contact entry 220 or 450 in contact entry 230, are compared with the PIN 720 in PIN field 710 in PIN info screen 700.

At block 1040 a determination is made as to whether a second contact communication identifier in one of the two contact entries matches a subscriber identifier. In some implementations the determination at action 1040 is made by an identification module 104 in FIG. 23. If there is no match then method 1000 terminates. When method 1000 terminates because of no match between the second contact communication identifier in one of the two contact entries and the subscriber identifier, the first contact entry having a contact communication identifier matching the predetermined communication identifier is identified as associated with the communication as is conventionally done. Alternatively, other methods such as most recently used techniques can be used to decide which of the two contacts is to be identified as associated with the communication. If there is a match, method 1000 proceeds to block 1050.

At block 1050, the contact entry which does not have a contact communication identifier matching a subscriber identifier, is identified as the contact entry associated with the communication. In some implementations, the identification of contact entry that does not have a contact communication identifier matching a subscriber identifier as the contact entry associated with the communication is carried out by an identification module 104 in FIG. 23.

As an example, at block 1040 it can be determined that contact entry 220 has contact communication identifier 320 which matches subscriber identifier 620, and therefore at block 1050 contact 230 can be identified as the contact entry associated with the communication.

As another example, at block 1040 it can be determined that contact entry 220 has contact communication identifier 340 which matches subscriber identifier 520 or subscriber identifier 580, and therefore at block 1050 contact 230 can be identified as the contact entry associated with the communication.

As yet another example, at block 1040 it can be determined that contact entry has contact communication identifier 350 which matches subscriber identifier 720, and therefore at block 1050 contact 230 can be identified as the contact entry associated with the communication.

Whereas conventionally the first contact entry having a contact communication identifier matching the predetermined communication identifier is identified as the initiator or recipient of the communication having the predetermined identifier, the method described herein has the advantage of excluding the subscriber of the mobile communications device as the initiator or recipient of that communication. As an example, when the subscriber's spouse calls the subscriber, the spouse's name appear in the caller ID screen, even if the contact entry for the subscriber alphabetically precedes the contact entry for the subscriber's spouse, in the address book.

While the blocks comprising the methods are shown as occurring in a particular order, it will be appreciated by those skilled in the art that many of the blocks are interchangeable and can occur in different orders than that shown without materially affecting the end results of the methods.

When two contact entries contain contact communication identifiers which each match a predetermined communication identifier, the contact entry associated with the communication identifier is identified by comparing another communication identifier in each of the two contacts with the subscriber identifier of the communications device. If a match occurs with one of the two contacts, then the other is identified as the contact associated with the communication.

FIG. 23 is a block diagram illustration of the components of the communications device 100. Communications device 100 comprises a processor 120, and a memory 101 connected to processor 120.

Memory 101 stores software modules that, when executed by processor 120, can implement the methods described herein. As an example, identification module 104 implements method 1000 of FIG. 10. As another example, displaying module 105 in FIG. 23 implements blocks 830 and 930 of FIG. 8 and FIG. 9, respectively.

Memory 101 stores other software modules, such as phone application 102 for making and receiving phone calls, and e-mail application 103 for sending and receiving e-mail messages.

Memory 101 also stores address book 200 described hereinabove. Memory 101 can also contain service books 106 which can contain service books for the various communications services supported by the communications device 100. The service books serve as subscriber identifiers as described hereinabove.

Memory 101 comprises non-volatile random access memory (NVRAM) for storing personal identification number (PIN) and/or a phone number associated with device 100, both serving as subscriber identifiers as described hereinabove.

Communications device 100 comprises a subscriber identify module (SIM) 160 that can contain a phone number associated with device 100 and serving as a subscriber identifier as described hereinabove.

Communications device 100 comprises display 110 as described hereinabove.

Communications device 100 comprises a communications interface 150 including a controller 152 and a radio 154. Communications interface 150 is coupled to an antenna 160. Communications interface 150 is also coupled with processor 120. Communications interface enables device 100 to carry out voice and data communications such as voice calls, e-mail, short messaging system (SMS), instant messaging, and the like.

Communications device 100 comprises a battery 190 for powering up processor 120, memory 101, display 110, communications interface 150, and other elements of the device.

The implementations of the present disclosure described above are intended to be examples only. Those of skill in the art can effect alterations, modifications and variations to the particular implementations without departing from the intended scope of the present disclosure. In particular, selected features from one or more of the above-described implementations can be combined to create alternative implementations not explicitly described, features suitable for such combinations being readily apparent to persons skilled in the art. The subject matter described herein in the recited claims intends to cover and embrace all suitable changes in technology.

What is claimed is:

1. A method for execution at a communications device, the method comprising:

searching an address book for a first and second contact entries, the address book having a plurality of contact entries, each contact entry storing a contact name identifier and at least two contact communication address identifiers, each of the first and second contact entries having a respective first contact communication address identifier matching a predetermined communication address identifier associated with an electronic communication;

in response to finding the first and second contact entries, comparing a second contact communication address identifier in each of the first and second contact entries with a subscriber address identifier associated with the communications device in response to a match of the second contact communication address identifier in the first contact entry to the subscriber address identifier, identifying the second contact entry as the contact entry associated with the electronic communication; and displaying the contact name identifier stored in the second contact entry.

2. The method of claim 1 wherein the electronic communication further comprises an incoming communication, and wherein the contact entry associated with the electronic communication includes an initiator of the incoming communication.

3. The method of claim 1 wherein the electronic communication further comprises an outgoing communication, and wherein the contact associated with the electronic communication includes a recipient of the outgoing communication.

4. The method of claim 1 wherein both the subscriber address identifier and the second contact communication address identifier further comprise telephone numbers.

5. The method of claim 1 wherein both the subscriber address identifier and the second contact communication address identifier further comprise personal identification numbers.

6. The method of claim 1 wherein both the subscriber address identifier and the second contact communication address identifier further comprise e-mail addresses.

7. The method of claim 1 wherein both the predetermined communication address identifier and the first contact communication address identifier further comprise telephone numbers.

8. The method of claim 1 wherein both the predetermined communication address identifier and the first contact communication address identifier further comprise electronic mail addresses.

9. The method of claim 1 wherein displaying a the contact name identifier stored in the second contact entry comprises displaying a message containing the contact name identifier.

10. A computer program product comprising a non-transitory computer-readable medium storing computer-readable instructions which, when executed, direct a communications device to:

search an address book for a first contact entry and a second contact entry, the address book having a plurality of contact entries, each contact entry storing a contact name identifier and at least two contact communication address identifiers, each of the first and second contact entries having a respective first contact communication address identifier matching a predetermined communication address identifier associated with an electronic communication;

in response to finding the first and second contact entries, compare a second contact communication address identifier in each of the first and second contact entries with a subscriber address identifier;

in response to a match of the second contact communication address identifier in the first contact entry to the subscriber address identifier, identify the second contact entry as the contact entry associated with the electronic communication; and display the contact name identifier stored in the second contact entry.

11. The computer program product of claim 10 wherein both the predetermined communication address identifier and the first contact communication address identifier further comprise telephone numbers.

12. The computer program product of claim 10 wherein both the predetermined communication address identifier and the first contact communication address identifier further comprise electronic mail addresses.

13. The computer program product of claim 10 wherein the instructions to direct the communications device to display the contact name identifier stored in the second contact entry further direct the communications device to display a message containing the contact name identifier stored in the second contact entry.

14. An electronic communications device, comprising:
a processor;
a memory connected to the processor, for storing at least one address book having a plurality of contact entries, each contact entry storing a contact name identifier and at least two contact communication address identifiers; and
computer-readable instructions, stored in the memory and executable on the processor, for an identification software module, the identification module operable for:
searching the address book for a first contact entry and a second contact entry, each of the first and second contact entries having a respective first contact communication address identifier matching a predetermined communication address identifier associated with an electronic communication;
in response to finding the first and second contact entries, comparing a second contact communication address identifier in each of the first and second contact entries with a subscriber address identifier associated with the electronic communications device;
in response to a match of the second contact communication address identifier in the first contact entry to the subscriber address identifier, identifying the second contact entry as the contact entry associated with the electronic communication; and
displaying the contact name identifier stored in the second contact entry.

15. The electronic communications device of claim 14 wherein the electronic communication further comprises an incoming communication, and wherein the contact entry associated with the electronic communication includes an initiator of the incoming communication.

16. The electronic communications device of claim 14 wherein the electronic communication further comprises an outgoing communication, and wherein the contact associated with the electronic communication includes a recipient of the outgoing communication.

17. The electronic communications device of claim 14 wherein both the subscriber address identifier and the second contact communication address identifier further comprise telephone numbers.

18. The electronic communications device of claim 14 wherein both the subscriber address identifier and the second contact communication address identifier further comprise personal identification numbers.

19. The electronic communications device of claim 14 wherein both the subscriber address identifier and the second contact communication address identifier further comprise e-mail addresses.

20. The electronic communications device of claim 14 wherein both the predetermined communication address identifier and the first contact communication address identifier further comprise telephone numbers.

* * * * *

UNITED STATES PATENT AND TRADEMARK OFFICE
CERTIFICATE OF CORRECTION

| | |
|---|---|
| PATENT NO. | : 8,208,911 B2 |
| APPLICATION NO. | : 12/713200 |
| DATED | : June 26, 2012 |
| INVENTOR(S) | : Sherif Aly Abdel-Kader |

It is certified that error appears in the above-identified patent and that said Letters Patent is hereby corrected as shown below:

In the Claims:

At claim 9, column 10, line 41 "displaying a the contact" should read --displaying the contact--.

Signed and Sealed this
Fourth Day of June, 2013

Teresa Stanek Rea
*Acting Director of the United States Patent and Trademark Office*